Jan. 27, 1970 R. D. KLETT 3,492,658

ELECTRONIC DESK CALCULATOR

Filed Jan. 16, 1968 2 Sheets-Sheet 1

INVENTOR
Rolf Dieter Klett
BY Spencer & Kaye
ATTORNEYS

INVENTOR
Rolf Dieter Klett
BY Spencer & Kaye
ATTORNEYS

United States Patent Office 3,492,658
Patented Jan. 27, 1970

3,492,658

ELECTRONIC DESK CALCULATOR

Rolf Dieter Klett, Constance, Germany, assignor to Telefunken Patentverwertungsgesellschaft m.b.H., Ulm (Danube), Germany Filed Jan. 16, 1968, Ser. No. 698,263
Claims priority, application Germany, Jan. 16, 1967, T 32,989
Int. Cl. G11b *13/00*
U.S. Cl. 340—172.5 7 Claims

ABSTRACT OF THE DISCLOSURE

An electronic desk calculator having a plurality of input/output devices each equipped with its own associated memory for input values, operands and results, so that when the input/output device of one user is disconnected from the central calculating unit the data fed in by the user remains stored at the associated input/output device.

BACKGROUND OF THE INVENTION

The present invention relates to desk calculators, and particularly to a calculator which may be operated from several locations.

Table model calculators are used predominantly for carrying out four fundamental arithmetic functions: addition, subtraction, multiplication and division. They differ from general-purpose computers in that they can not be freely programmed and in that their storage capacity is limited to a few memory cells.

Memory elements generally consist of magnetizable ferrite cores or recirculating loops. The latter consist of a delay line whose one end is mechanically excited by write-in pulses, for example, and from whose other end a pulse sequence in the pattern of the write-in pulses can be read out after a certain delay time, or circulation time. The pulse sequences are amplified, the pulses regenerated and again fed into the loop as write-in pulses. In this manner a dynamic memory is created without requiring discrete storage elements for each individual bit.

All operands and, if required, subtotals can be stored in such a delay line. With the aid of logic gates, certain information can be withdrawn from the memory and fed into the calculating unit.

Compared with mechanical calculators, electronic desk calculators have the advantage of greater speed and quieter operation.

It is known to provide an electronic desk calculator with with a plurality of spatially separated input/output devices for increasing the degree of utilization of the calculator. An electronic switch connects one of the input/output devices at a time to the calculator so that it can be operated from successive input/output locations.

In such systems, however, each input/output device must be provided with a separate operating element for connecting the device to the calculator when it is not being used from another location. When one user has finished using the calculator he must disconnect his input/output device from the calculator. However, the user must first remove from the calculator memory all data of interest to him and must reintroduce this data into the calculator at a later date, if required.

It often occurs that such arrangements can not be utilized to their full capacity because it is possible for one user to tie up the calculating unit by leaving his input/output device connected thereto while not actually using the calculator. This can occur because such arrangements do not have any provision for disconnecting one such input/output device, either by some automatic operation of the calculator unit or by means of one of the other input/output devices. Moreover, because data storage is preformed by the central calculator unit, it would be possible for one user to lose his data when his device is disconnected from the calculator unless special precautions are taken to record this data before disconnecting the input/output device from the calculator. It is because the disconnection of an input/output device from the calculator would result in the loss of data that no provision can be made for permitting one input/output device to be disconnected other than by the action of the user of that particular device.

SUMMARY OF THE INVENTION

It is a primary object of the present invention to overcome these drawbacks and difficulties.

Another object of the present invenion is to increase the ability of the calculator unit of such arrangements to be utilized to its full capacity.

Still another object of the present invention is to prevent any user from losing his data when his input/output device is disconnected from the calculator unit.

Still another object of the present invention is to permit the automatic disconnection of an input/output device when it has not been in active use for a certain period of time.

These and other objects according to the present invention are achieved, in an electronic calculator having a data memory, an arithmetic unit and a control unit, by the improvement composed of at least one remote input/output device provided with its own associated memory for storing the operands and results of calculations directed by that device, and connecting means for connecting each such device in circuit in the calculator.

The present invention thus provides an electronic desk calculator having a data memory, a calculating unit and a control unit, with at least one substation provided with its own input/output device and arranged in such a way that data associated with calculations made from that substation remains stored even when the substation is disconnected from the central station.

It is further possible, according to the present invention, to automatically disconnect one substation, When no data have been entered therefrom for a certain period of time, without thereby destroying, or erasing, the information stored in the respective substation. Thus it is achieved that each substation has its own associated operand and result memory.

One particular embodiment of the calculator according to the present invention is constructed so that each substation has an associated delay line memory having an input, or read-in, amplifier connected to its input and an output, or read-out, amplifier connected to its output, each such substation also having its own pulse regenerating stage and each delay line memory being connectable to the calculating unit via logic gates controlled by the calculator control unit.

DESCRIPTION OF THE PREFERRED EMBODIMENTS

Figure 1:
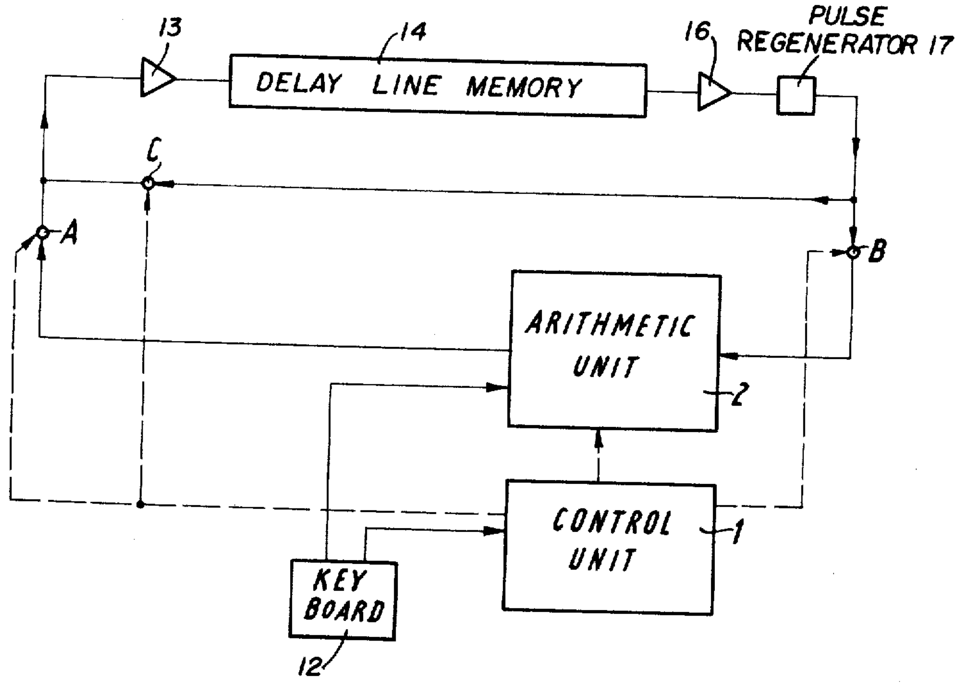
FIGURE 1 is a block diagram of a known desk calculator having a delay line memory according to the present invention.

FIGURE 1 shows a calculator which includes a known combination of a control unit 1 and an arithmetic unit 2. There is also shown a read-in amplifier 13 connected to the input of a delay line 14. The output of the delay line is connected to the input of a read-out amplifier 16 which is in turn connected to a pulse regenerating stage 17. A suitable display device can be connected to the output of amplifier 16.

The pulse regenerating stage is connected, via a switch or gate B, to the input of arithmetic unit 2 and, via a further gate or switch C, to the input of the amplifier 13. Also applied to the input of amplifier 13 is the output of the arithmetic unit, this being via a gate or switch A. The gates A, B and C are connected to be controlled by control unit 1 in a manner which will be described in detail below. In FIGURE 1, the broken lines carry control information while the solid lines carry data information.

A keyboard 12, which is physically grouped with the delay line circuit and which is part of the input/output device, is connected to deliver new data to be processed to the arithmetic unit 2 and to deliver the corresponding processing instructions, e.g. "multiply," "add," to the control unit 1. The control unit 1 then separates in a known manner, the processing instructions into individual signals for opening and closing gates A, B and C.

The length of the delay line depends on the number of registers and on the bit capacity of each register. When the calculator is not performing any calculating operations and information has previously been stored in line 14, the pulses arriving at the right end of the delay line are amplified by amplifier 16, regenerated by the pulse regenerating stage 17, and again entered into the delay line 14 via the open, i.e., nonblocking, circulating gate C and the read-in amplifier 13.

A counter (not shown) in the control unit 1 indicates when a certain piece of information appears at the output of the delay line. The counting capacity of the counter is determined by the length of the line and the number of pieces of information, or digits, to be stored therein.

If a certain piece of information is to be transferred from the delay line into the arithmetic unit, the control unit 1 opens, i.e. unblocks, the reading gate B when the associated counter position has been reached. At this time the circulating gate C remains open so that the information stored in the delay line continues to circulate through the memory loop, i.e., remains stored in the memory.

Thus, the control unit 1 causes selected register contents, or data words, to be conducted via gate B to the arithmetic unit 2 each time the counter position corresponding to one such word has been reached. This data is there subjected to computing operations according to instructions from the control unit 1 and the result is fed into the delay line 14 via the writing gate A.

Whenever a value or data word is transferred from the arithmetic unit, the control unit closes circulating gate C, and thus erases the previous contents of that register position which is intended to receive the new value from the arithmetic unit. It will be appreciated that the successful performance of these operations requires that one of the gates A and C be open and the other closed at any given time in order to prevent two data words from being superimposed and to prevent the unintentional loss of information circulating through the memory.

If it is assumed that the instruction to read in data from the arithmetic unit to the memory is designated as "$a$" and the instruction to transfer data from the memory to the arithmetic unit is designated as "$b$," the conditions under which each gate will be open may be represented in logical notation as follows:

$$\text{gate } A=a,\ \text{gate } B=b,\ \text{gate } C=\bar{a}$$

where $\bar{a}$ represents "not $a$."

Figure 2:
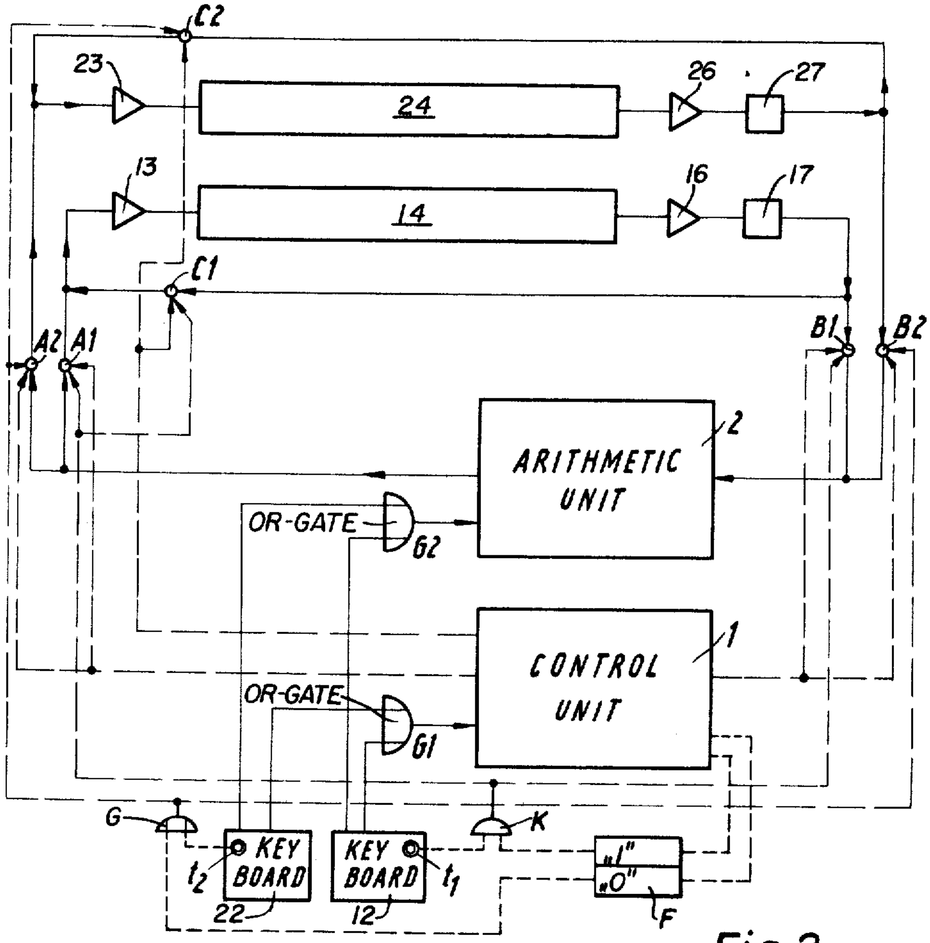
FIGURE 2 is a block diagram of a similar calculator provided with two input/output devices according to the present invention.

FIGURE 2 is a block diagram of a desk calculator with two input/output devices each including an input keyboard and a delay line memory with associated auxiliary equipment. The combination of FIGURE 2 includes, in addition to the elements shown in FIGURE 1, a second input/output device composed of a second delay line 24 having a read-in amplifier 23, a read-out amplifier 26 and a pulse regenerating stage 27. This second device is connected in parallel with the first delay line between the input and output of unit 2. The first device is provided with gates A1, B1 and C1, while the second device is provided with corresponding gates A2, B2 and C2.

Different information streams circulate in the two circulating memories independently of each other. However, information can be fed into the arithmetic unit at any given instant only via one of the reading gates B1 or B2. Each one of the two substations has its keyboard 12 or 22 provided with a key $t_1$ or $t_2$, respectively, the depression of which connects the respective substation to the central calculator units. Employing the above-defined machine instructions $a$ and $b$, the following relationships should exist in the system:

$$\text{gate A1}=a\cdot t_1=\overline{\text{gate}}\ \overline{\text{C1}}$$
$$\text{gate B1}=b\cdot t_1$$
$$\text{gate A2}=a\cdot t_2=\overline{\text{gate}}\ \overline{\text{C2}}$$
$$\text{gate B2}=b\cdot t_2$$

where the symbol "$\cdot$" represents "and." Thus the first relationship may be read as follows:

Gate A1 is open when instruction $a$ is present and key $t_1$ is depressed, under which conditions gate C1 is blocked.

In addition the states of gates A1 and C1 and of gates A2 and C2 are related to one another in the same manner as that set forth above with reference to the gates A and C of FIGURE 1.

Generally, instead of the indices 1 and 2, the index $i$ can be inserted for the $i^{\text{th}}$ substation. The equations indicate that, for example, the writing gate A1 is open whenever the instruction $a$ to write in from the arithmetic unit is given by the control unit and when key $t_1$ of the first substation has simultaneously been depressed. When gate A1 is open, gate C1 must be closed.

Care must be taken that only one of the keys $t_i$ be effective at any one time, so that only one substation will be connected to the central station at any one time.

In FIGURE 2 key $t_1$ is built into the input keyboard 12 and key $t_2$ is built into the input keyboard 22. Upon depression of one of the keys $t_i$, the gates A. B and C of the associated substation are switched, in accordance with the given equations, via gates G and K, the function of which is to be described later, and the control lines, shown as dashed lines. Each one of the keyboards 12 and 22 is connected to the arithmetic unit 2 via a common OR-gate G2 for the input of data to be processed and to the control unit 1 via a further common OR-gate G1 for the input of processing or control signals. The machine instructions $a$ and $b$ given in the above equations are passed by the control unit 1 to the gates A1, A2 or C1, C2 and B1, B2.

Figure 3:
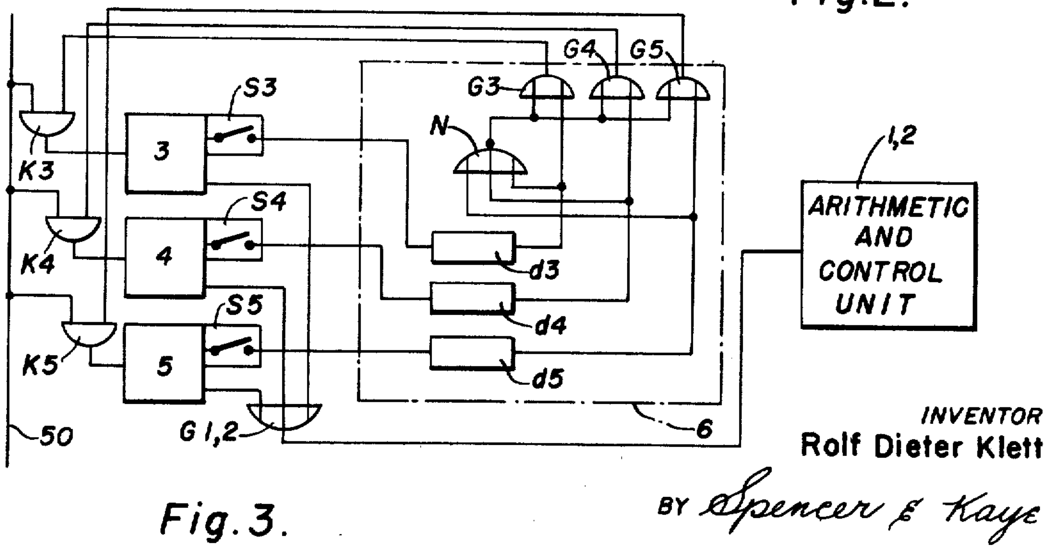
FIGURE 3 is a simplified block diagram of a calculator with a plurality of input/output devices according to the invention.

FIGURE 3 shows a central station 1, 2 to which a plurality of substations 3, 4, 5 can be successively connected via a selector 6. The selector 6 is a switch which connects one of the substations at a time to the central station. Instead of the keys $t_i$, a timing circuit can be used which connects a particular substation to the central station for a certain period of time (e.g., 10 seconds). If no data or signals are fed in during this time period, the timing circuit disconnects the particular substation and thus releases the central station for another user.

This is achieved in the following way. In each of the substations there is installed a switch $S_i$ which is closed as long as any one of the keys on the keyboard of this substation is depressed. Assumed that a key in substation 3 is held depressed during a certain time, switch S3 is closed during the same time and thus delivers a rectangular pulse to a delay device $d3$, which delays the trailing edge of the pulse by, e.g., 10 seconds. The extended pulse is fed to an OR-gate G3 and to a NOR-gate N. The other inputs of the NOR-gate N are individually connected to the outputs of the delay devices $d4$, $d5$ which in turn are connected to the switches S4, S5 of the other substations and operate in the same manner as delay device $d3$. The output of NOR-gate N is connected to a second input of OR-gate G3 as well as to second inputs of OR-gates G4, G5, associated to the other substations. During the application of the extended pulse from delay device $d3$ the OR-gate G3 issues a potential which holds an AND-gate K3 open so that a supply voltage from a bus line 50 is supplied to the electrical installations of the keyboard of substation 3. Thus, this keyboard is able to operate upon the central station 1, 2 via OR-gate G1, 2.

The NOR-gate N however, during the application of the extended pulse from delay device $d3$, issues a potential, which is the same as the potential at the output of delay devices $d4$, $d5$ in their quiescent state. OR-gates G4, G5, therefore, propagate a similar potential, which closes AND-gates K4 and K5, so that the keyboard installations of substations 4 and 5 are disconnected from the supply voltage bus 50 and are not able to operate upon the central station 1, 2.

This state is substained as long as an operator depresses any keys at substation 3 with a sufficient frequency. If, however, after releasing a key, more than 10 seconds pass away without a subsequent key depression, then, after the 10 seconds, the delay device $d3$ returns to its quiescent state. With all delay devices $d3$, $d4$, $d5$ in their quiescent state, the output of NOR-gate N delivers a potential which opens, via the OR-gates G3, G4, G5, the AND-gates K3, K4, K5 so that all the substations 3, 4, 5 are connected to the supply voltage bus 50.

Proceeding from this state, it is easily to be seen, that by depression of any key in any one of the substations this substation is held connected to the supply voltage bus line 50 while the other substations are disconnected, as described in detail with respect to substation 3.

The values fed into the substation by the first user remain stored in the corresponding circulating memory so that they are available at any later time. It is therefore possible for one user to interrupt his calculations at any desired point or to leave the substation without interfering with the calculating operations and without the loss of information.

In the described arrangement of a central station and substations, it is advisable to dispose the entire circulating memory of each substation, together with the associated input/output devices, within the substation since then the system can be enlarged simply by the addition of new substations.

Under certain circumstances it might be more practical to provide only the input/output devices at the substations and to dispose all of the memories in the central station. In this way, the circulating memory of one or a plurality of substations can be used to enlarge the storage capacity of the central station.

It is often desirable for bookkeeping operations, and for several other applications, to be able to store more data in the machine than can be stored in one individual circulating memory. The here required increase of storage capacity can be accomplished, for example, by parallel connection of a plurality of delay lines. Data can then be taken from selected register locations of one of the delay lines by a signal from the control unit and can be combined in the arithmetic unit, for example, with data from another delay line.

For this purpose, the gates G and K, which are already mentioned and shown in FIGURE 2, are operable by a bistable flipflop F. In the state of flipflop F as indicated by the numerals "1," "0" in the drawing the AND-gate K is open, in the other state of flipflop F the AND-gate K is closed, and the "1" potential is supplied to the OR-gate G. Flipflop F is operable by means of control unit 1 in two different modes. If both keyboards 12 and 22 are to be used as already described, then flipflop F is held in its state as indicated in the drawing, and the operating signals for the gates A1, B1, C1 and A2, B2, C2, originating from the keyboards 12 and 22, are propagated through the gates K and G, respectively. If, however, both delay lines 14 and 24 shall be used by the operator of keyboard 12, then the flipflop F is operated by the control unit 1 to go into its other—nonindicated—state at all times when the arithmetic unit 2 is to be connected to delay line 24. The mode in which the flipflop F is to be operated by the control unit 1 can be determined by signals from keyboards 12 and 22.

It is also possible to transport data from one delay line to another. Such a transfer occurs, in the machine described herein, via the arithmetic unit. It is possible, however, to establish direct connections between the circulating memories via special gates.

It is advisable to construct each circulating memory as a plug-in unit so as to take full advantage of the multiple possibilities for expansion and interconnection in the described desk calculator.

The provision of a separate data memory in each substation as disclosed in the present invention is not limited to circulating memories, and use can also be made of magnetic core and other types of memories.

It will be understood that the above description of the present invention is susceptible to various modifications, changes and adaptations, and the same are intended to be comprehended within the meaning and range of equivalents of the appended claims.

I claim:

1. In an electronic calculator having a data memory, an arithmetic unit and a control unit, the improvement comprising at least one remote substation having an associated input/output device provided with its own associated memory for storing the operands and results of calculations directed by that device, and connecting means for connecting each said device in circuit in said calculator, wherein each said input/output device comprises: a delay line memory; a read-in amplifier having its output connected to the input of said memory; a read-out amplifier having its input connected to the output of said memory; a pulse regenerating stage having its input connected to the output of said read-out amplifier; a first logic gate A connected between said arithmetic unit and the input of said read-in amplifier; a second logic gate B connected between the output of said pulse regenerating stages and said arithmetic unit; and a third logic gate C connected between the output of said pulse regenerating means and the input of said read-in amplifier, said control unit being connected for controlling the opening and closing of said gates.

2. An arrangement as defined in claim 1 wherein said delay line memory of at least one said input/output device is connectable to expand the data storage capacity of said calculator.

3. An arrangement as defined in claim 1 further comprising, for each said substation, a data input keyboard having data transfer means connected to said arithmetic unit and to said control unit and having a key controlled switch for connecting said keyboard to said arithmetic and control units, said switch and said control unit being connected to control inputs of said logic gates for causing the operating state of each gate to be controlled according to the following conditions:

(i) gate A will be opened when, and only when, said switch of its associated keyboard is activated and when said control unit delivers a signal to said gate A indicating that data is to be delivered from said arithmetic unit to said delay line memory;

(ii) gate B will be opened only when said switch of its associated keyboard is activated and when said control unit delivers a signal to said gate B indicating that data is to be delivered from said memory to said arithmetic unit; and (iii) gate C will always be in the opposite state from gate A.

4. In an electronic calculator having a data memory, an arithmetic unit and a control unit, the improvement comprising a plurality of remote substations each having an associated input/output device provided with its own associated memory for storing the operands and results of calculations directed by that device, connecting means for connecting each said device in cihcuit in said calculator, and selector means connected between all said substations and said arithmetic and control units for operatively connecting only one of said substations at a time to said arithmetic and control units, said selector means including timing means for breaking the operative connection between any given substation and said arithmetic and control units when no data has been delivered from such substation for a given period of time.

5. In an electronic desk calculator having at least two stations each provided with a keyboard for the input of data and instructions and a data output device, the improvement wherein said calculator further comprises an arithmetic unit and a control unit provided at only one of said stations, and wherein each said station comprises a memory for storing the operands and results of calculations carried out from its associated station, and key controlled switch means operable to connect said memory of its associated station with said arithmetic and control units.

6. An arrangement as defined in claim 5 further comprising connection control means connected between all of said keyboards and memories for preventing the memories of all but one of said stations from being operatively connected with said arithmetic and control units when said memory of said one of said stations is so connected and said keyboard of said one of said stations is being operated, and for breaking the operative connection between said one substation and said arithmetic and control units only after the keyboard of said one station has not been utilized for a predetermined period of time.

7. An arrangement as defined in claim 5 further comprising memory switching means associated with the memories of all of said stations for selectively connecting the memories of more than one of said stations in operative association with a respective one of said keyboards.

References Cited

UNITED STATES PATENTS

| | | | |
|---|---|---|---|
| 3,242,470 | 3/1966 | Hagelbarger et al. | 340—172.5 |
| 3,328,763 | 6/1967 | Rathbun et al. | 340—172.5 |

OTHER REFERENCES

IBM Technical Disclosure Bulletin, vol. 6, No. 2, July 1963, pp. 48–50, Hanson et al.

RAULFE B. ZACHE, Primary Examiner